No. 706,879. Patented Aug. 12, 1902.
W. R. AYER.
WHIFFLETREE CLIP.
(Application filed June 14, 1902.)
(No Model.)
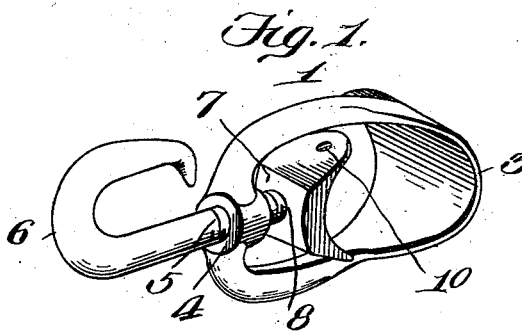
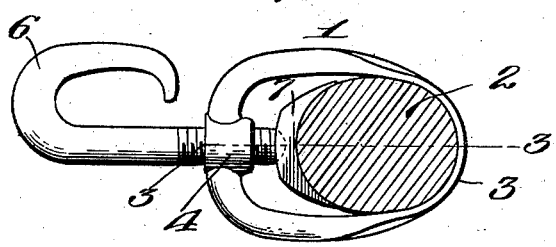
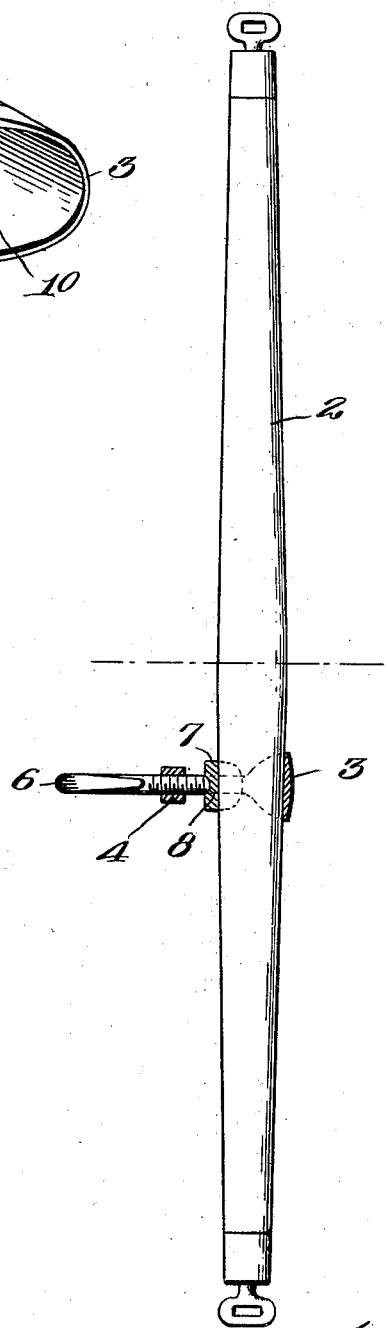
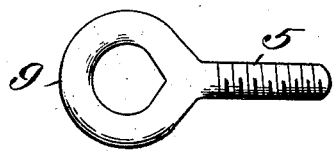
Witnesses:
C. D. Kesler.
Dornis Dumby.
Inventor
Walter R. Ayer
By James L. Norris
Atty.
THE NORRIS PETERS CO., PHOTO-LITHO., WASHINGTON, D. C.

UNITED STATES PATENT OFFICE.

WALTER R. AYER, OF RACCOURCI, LOUISIANA.

WHIFFLETREE-CLIP.

SPECIFICATION forming part of Letters Patent No. 706,879, dated August 12, 1902.

Application filed June 14, 1902. Serial No. 111,689. (No model.)

*To all whom it may concern:*

Be it known that I, WALTER R. AYER, a citizen of the United States, residing at Raccourci, in the parish of Pointe Coupee and State of Louisiana, have invented new and useful Improvements in Whiffletree-Clips, of which the following is a specification.

This invention relates to whiffletree-clips, and has for its object to provide a novel, simple, and inexpensive clip for connecting the whiffletree to the doubletree-clevis or the like and which can be readily attached to and detached from the whiffletree and adjusted thereon without the employment of tools or the aid of an artisan or mechanical skill.

To these ends my invention consists in the features and in the construction, combination, and arrangement of parts hereinafter described, and particularly pointed out in the claim following the description, reference being had to the accompanying drawings, forming a part of this specification, wherein—

Figure 1 is a perspective view of my improved clip. Fig. 2 is a view in side elevation thereof, showing the same applied to a whiffletree, which latter is shown in cross-section. Fig. 3 is a horizontal section taken on a line 3 3 of Fig. 2 and showing the clip adjusted to one side of the center of the whiffletree. Fig. 4 is a detail view of an alternative construction of the means for attaching the clip to the doubletree-clevis or other draft device.

Referring to the drawings, the numeral 1 indicates an endless metallic band or collar, elongated, as shown, and adapted to loosely encircle the whiffletree 2. One end of the collar is flattened and widened, as at 3, to embrace and snugly fit the whiffletree for approximately one-half its diameter. The other end of the collar 1 is provided with an internally-threaded boss 4, through which is screwed a threaded shank 5, which is provided at its outer end with a hook or loop 6, that in practice is connected to a suitable fastening (not shown) on the doubletree or clevis.

Disposed between the threaded end of the shank 5 and the whiffletree is a swivel-block 7, consisting of an arc-shaped metallic plate that is adapted to loosely fit against one edge of the whiffletree and is provided centrally with a recess or step-bearing 8, in which is arranged to fit the inner end of the shank 5.

To place the clip in position on the whiffletree, it is only necessary to loosely slip it over the whiffletree and then screw up the attaching device 5 6 tightly in place, clamping the collar about the whiffletree and causing the swivel-block 7 to bind against the other side of the whiffletree. The clip is thus firmly and securely clamped in place, and the fastening device 5 6 may then be engaged with the doubletree or clevis in the usual manner.

It will be noted that the clip can be applied to the whiffletree in a very short time, and it can be readily tightened up should the wood shrink and may be as quickly detached should the whiffletree break and be reapplied to a new whiffletree.

In farm-work it often becomes necessary for the plowman when plowing close to large growing crops to arrange the clip to one side of the center of the whiffletree, and by means of my improved clip this adjustment can be very quickly accomplished by unscrewing the shank 5 slightly and slipping the clip to the desired point and tightening the shank up again.

All of the above operations can be quickly and conveniently performed without the employment of any tools or mechanical skill.

Instead of providing the shank 5 with an open loop or hook 6 the fastening device shown in Fig. 4 of the drawings may be substituted, said device comprising the threaded shank 5, provided with a closed eye or loop 9, similar in construction to an eyebolt.

In practice I prefer to provide either one or both of the extremities of the swivel-block 7 with a perforation or perforations 10, so that when the parts are assembled for shipment or transportation a wire, cord, or the like may be passed through said perforation or perforations and around the sleeve or collar 1 and be knotted or tied, so that during the shipment or transportation of the clips the swivel-block will not become lost or displaced.

Having described my invention, what I claim is—

A clip for whiffletrees comprising an elongated collar, having one flattened and broadened portion constructed to encircle approximately one-half the circumference, and provided at its other end with an internally-threaded boss, a fastening device consisting of a loop and a threaded shank fitted in said boss, and a swivel-block consisting of an arc-shaped metal plate constructed to fit against one edge of the whiffletree and provided with a step-bearing, the end of the shank being arranged to engage the step-bearing and when screwed up operating to force the swivel-block against the whiffletree and draw the flat and broadened portion of the collar against said whiffletree, the operative or inner face of the collar and swivel-block being smooth to permit the clip to be readily adjusted longitudinally on the whiffletree, substantially as described.

In testimony whereof I have hereunto set my hand in presence of two subscribing witnesses.

WALTER R. AYER.

Witnesses:
EMILE HONORÉ,
E. H. LEDOUX.